United States Patent [19]

Tomatis

[11] Patent Number: 4,615,680
[45] Date of Patent: Oct. 7, 1986

[54] APPARATUS AND METHOD FOR PRACTICING PRONUNCIATION OF WORDS BY COMPARING THE USER'S PRONUNCIATION WITH THE STORED PRONUNCIATION

[76] Inventor: Alfred A. A. Tomatis, 68 Boulevard de Courcelles, 75017 Paris, France

[21] Appl. No.: 610,643

[22] Filed: May 16, 1984

[30] Foreign Application Priority Data

May 20, 1983 [FR] France .............................. 83 08383

[51] Int. Cl.$^4$ ...................... G09B 19/04; G09B 19/06
[52] U.S. Cl. .................................... 434/157; 434/185
[58] Field of Search ............... 434/156, 157, 185, 167, 434/169

[56] References Cited

U.S. PATENT DOCUMENTS 3,703,041 11/1972 Kohtani .
3,881,059 8/1973 Stewart .............................. 434/185
4,020,567 5/1977 Webster .
4,363,102 12/1982 Holmgren et al. .................. 434/156
4,380,438 4/1983 Okamoto ............................ 434/157
4,417,319 11/1983 Morimoto ........................... 434/157
4,489,396 12/1984 Hashimoto et al. ................ 434/157

FOREIGN PATENT DOCUMENTS 2109436 5/1972 France .
2475771 8/1981 France .

Primary Examiner—Richard C. Pinkham
Assistant Examiner—MaryAnn S. Lastova
Attorney, Agent, or Firm—Sandler & Greenblum

[57] ABSTRACT

An apparatus for assisting the practice of the mother tongue or a foreign language, with a view to total assimilation thereof, comprises a standard signal generator constituted by a mobile support of sound recordings on which are previously recorded, independently of one another, blocks of phrases or words, expressed in the language to be assimilated by a subject. A reader of these blocks of information emits the standard signals.

An analysis and comparison circuit compares a standard signal and a vocal signal which corresponds to the word pronounced by the user, based on at least one parameter. When the vocal signal is not within a predetermined tolerance of the standard signal, the standard signal is repeated. If the vocal signal is within the tolerance, the next standard signal is generated. In this way, the user repeats each word until he pronounces it correctly.

26 Claims, 2 Drawing Figures

APPARATUS AND METHOD FOR PRACTICING PRONUNCIATION OF WORDS BY COMPARING THE USER'S PRONUNCIATION WITH THE STORED PRONUNCIATION

BACKGROUND OF THE INVENTION

The present invention relates to an apparatus for assisting the practice of the mother tongue or a foreign language, with a view to total assimilation thereof.

Apparatus intended for assimilation of a foreign language are already known. These apparatus generally comprise a magnetic tape reader on which phrases expressed in the foreign language which is to be assimilated are previously recorded, with the correct intonation. The output of this tape reader is connected to ear-phones placed over the ears of the subject having to learn the language and this subject has to pronounce each phrase which he hears from the magnetic tape reader several times in succession until his pronunciation is correct. However, the quality of the subject's pronunciation can only be assessed by a third party whose mother tongue is the language being assimilated and such a procedure therefore presents a considerable drawback since the foreign language cannot be learned entirely independently.

SUMMARY OF THE INVENTION

It is an object of the present invention to overcome these drawbacks by providing an apparatus allowing perfect integration of the mother tongue or a foreign language, without requiring the presence of a third party.

To this end, this apparatus for assisting the practice of the mother tongue or a foreign language, with a view to total assimilation thereof, consists of a standard signal generator constituted by a mobile support of sound recordings on which are previously recorded, independently of one another, blocks of sound information such as phrases or words, expressed in the language to be assimilated by a subject, and a reader of these blocks of information emitting the standard signals, an electric acoustic transducer connected to the standard signal generator and emitting in sound form the standard information blocks so that the latter are heard by the subject, and a microphone into which the subject speaks, is characterized in that it consists of an analysis and comparison circuit constituted by a plurality of two-input comparators and by one output stage, each of these comparators having a first input connected to the output of the standard signal generator and a second input connected to the microphone, so as to be able to effect, as far as one of several parameters, such as the intensity, rhythm, the slope and extent of the pass band, the latency time, the precession time, the attack of the sounds, the relaxing of the sounds, etc . . . is concerned, an elementary comparison between the standard signal emitted by the standard signal generator and the vocal signal corresponding to the sound message pronounced by the subject, in response to hearing the standard information block emitted, the output stage being connected to the various comparators and to the standard signal generator so as to provoke the emission, by the standard signal generator, of the same standard signal as long as the vocal signal produced by the microphone, when the subject repeats herein the sound message which he has just heard, does not concord, to an adjustable determined degree of approximation, with the standard signal as far as each parameter taken into consideration is concerned.

According to a further feature of the invention, the various comparators are connected in cascade, via AND gates, and the last comparator is connected to the output stage so as to emit a control signal applied thereto, to provoke the emission of a following new standard signal, solely when the comparisons made by the various comparators have all given satisfactory results as far as the respective parameters taken into consideration are concerned.

BRIEF DESCRIPTION OF THE DRAWINGS

The invention will be more readily understood on reading the following description with reference to the accompanying drawings in which:

Referring now to the drawings, FIG. 1 shows a block diagram of the apparatus according to the invention which comprises a generator of standard or reference signals corresponding to blocks of standard information or standard messages, this generator generally being designated by reference 1. This generator consists of at least one mobile sound recording support on which are previously recorded, independently of one another, the standard information blocks or messages, such as phrases or words expressed in the language having to be assimilated by a subject 2. The generator 1 may consist of, for example, a first tape recorder 3 on the magnetic tape of which are recorded, in succession, the standard information blocks. The output of this tape recorder 3 is connected to a second recorder 4 of the loop type adapted to record one of the elementary standard information blocks previously stored on the magnetic tape of the first recorder 3, and to successively repeat this same information block, during the process of language acquisition.

Figure 1:
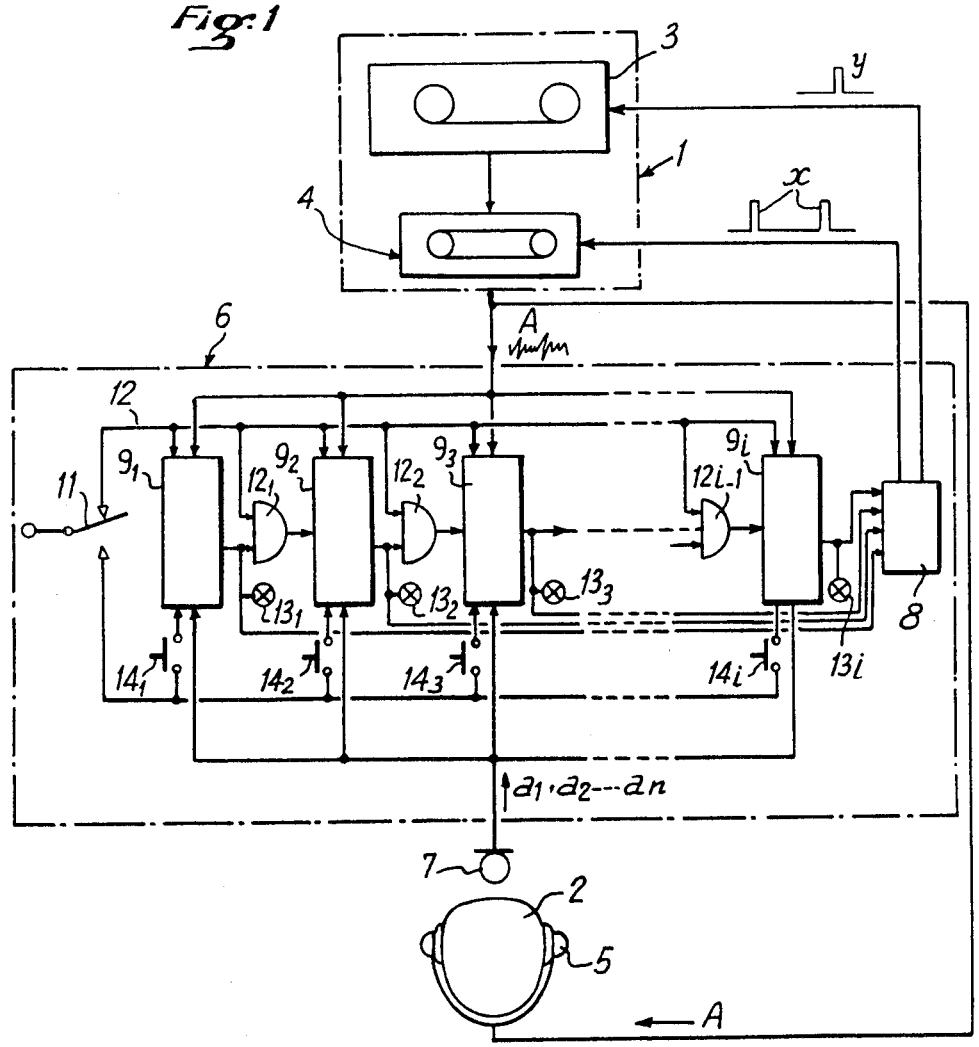
FIG. 1 is a block diagram of an apparatus for assisting the practice of the mother tongue or a foreign language, with a view to total assimilation thereof.

The two recorders 3 and 4 may be replaced by one single recorder, provided that rapid limited play-back thereof can be automatically controlled in order to enable the same standard signal corresponding to a determined standard information block to be emitted several times in succession.

Furthermore, recorders 3 and 4 might also be replaced by any other sound recording apparatus with mobile recording support enabling several standard information blocks or messages to be stored one after the other and enabling the same standard signal corresponding to an information block to be emitted successively several times.

The output of the standard signal generator 1 is connected, on the one hand, to an electroacoustic transducer 5, such as ear phones placed over the ears of the subject 2 having to assimilate the language being studied or a loud speaker and, on the other hand, to an analysis and comparison circuit generally designated by reference 6.

Furthermore, the apparatus comprises a microphone 7 also connected to the analysis and comparison circuit 6 which comprises an output stage 8 connected to the standard signal generator 1.

Figure 2:
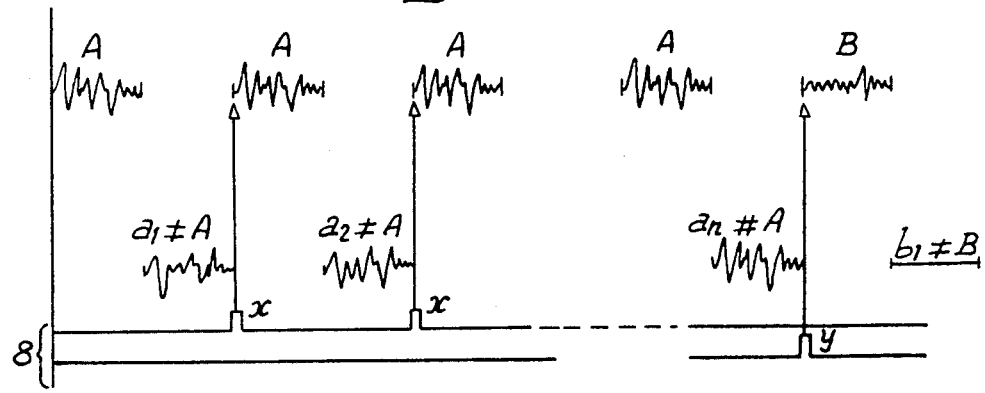
FIG. 2 is a diagram of wave form showing the operation of the apparatus of FIG. 1.

The general modus operandi of the apparatus which has just been described is as follows:

At the beginning of the language acquisition process, the standard signal generator 1 emits at its output a standard or reference signal A, as shown in FIG. 2, corresponding to a block of information constituted, for example, by a phrase or a word previously recorded on the magnetic tape of the principal recorder 3. This phrase or word is then transferred to the magnetic tape of the loop recorder 4 so as to be able to be emitted repeatedly. The loop recorder 4 therefore emits at its output an analog or digital standard signal A, of amplitude variable in time and which to some extent constitutes a reference signal since it corresponds to the perfect pronunciation, in the language in question, of the phrase or word which must then be pronounced correctly by the subject 2. The standard signal A is applied, as has been seen previously, both to the analysis and comparison circuit 6 and to the ear-phones 5. Consequently, the subject 2 hears the phrase or the word emitted correctly and tries to repeat this phrase or word as precisely as possible. Consequently, after having heard the reference phrase or word via the earphones 5, the subject 2 pronounces this same phrase or word, which is translated by the production, by the microphone 7, of a vocal signal concording more or less with the standard signal A. At the beginning of the language acquisition process, the vocal signal a1 emitted by the subject 2 is obviously fairly different from the standard signal A and the analysis and comparison circuit 6 detects this difference. This circuit, which will be described in detail hereinafter, then acts on the output stage 8 so that it emits a signal x applied to the generator 1, signal provoking a further emission of the same standard signal A by the loop recorder 4.

The same process as described hereinbefore then continues, the subject 2 emitting, in response to the second standard signal A which it has just received, a second vocal signal a2 closer to the standard signal A but still different therefrom. Consequently, the analysis and comparison circuit 6 again emits, via its output stage 8, the control signal x applied to the generator 1 which then delivers, as before, the same standard signal A.

The above process is repeated and each time the subject improves pronunciation of the word or phrase constituting the standard signal A until this word or phrase concords, to a certain degree of approximation, with the standard signal A. At that moment, the analysis and comparison circuit 6 detects the total or approximate concordance between the vocal signal $a_n$ emitted by the subject 2 and the standard signal A and, via its output stage 8, it then emits a second control signal y which is applied to the generator 1 and which provokes the replacement, on the loop recorder 4, of the first standard information block, corresponding to the standard signal A, by a new information block, corresponding to a new standard signal B. From that moment, the generator 1 repeatedly emits the second standard signal B at its output and the process of analysis and comparison continues as before, the first vocal signal b1 emitted by the subject 2 being compared with standard signal b1, and so on.

An embodiment of the analysis and comparison circuit 6 will now be described in detail. This circuit comprises an assembly of two-input comparators $9_1$, $9_2$, $9_3$ . . . $9_i$ which are respectively associated with the various parameters according to which the elementary comparisons between the standard signals such as standard signal A, and the vocal signals $a_1$, $a_2$ . . . $a_n$ emitted by the subject 2, must be made. For example, the first comparator $9_1$ compares the signals applied to its two inputs from the point of view of intensity, the second comparator $9_2$ compares them as far the rhythm is concerned, the third comparator $9_3$ compares them as far as the width of the pass band is concerned, the comparator $9_i$ making the comparison regarding the slopes of the pass bands. For each of the parameters on which these comparisons are made, a more or less wide margin of error may be determined a priori and to this end the range in which the result of the comparison is considered as being good may be varied for each of the comparators. To this end, each of the comparators $9_1$ . . . $9_i$ may be provided with an adjusting button enabling the extent of this range to be adjusted. If the subject wishes to be more and more demanding regarding the acquisition of the language, the range may be adjusted as desired so that the percentage of error tolerated decreases and finally becomes equal to 0%, in the ideal case.

Two modes of operation may be envisaged for the analysis and comparison circuit 6, namely with automatic passage from the comparison of one parameter to the comparison of another parameter or, on the contrary, with manual selection, by means of push buttons, of each comparator having to intervene to determine the degree of acquisition of the language. To this end, a two-position switch 11 may be used, which, in a first position, as shown in FIG. 1, renders operational all the comparators $9_1$ . . . $9_i$, since a common conductor 12, connected to supply inputs of all these comparators, is then connected to a source of voltage of appropriate polarity. This common conductor 12 is also connected to first inputs of two-input AND gates $12_1$, $12_2$ . . . $12_{i-1}$. These AND gates are disposed between the successive comparators so as to connect them in cascade and their second inputs are respectively connected to the output of the comparator located upstream in the comparator chain. For example, the first AND gate $12_1$ of which the output is connected to an enabling input of the second comparator $9_2$, is connected, by its second input, to the output of the first comparator $9_1$.

To the outputs of the various comparators there are also connected pilot lamps $13_1$, $13_2$ . . . $13_i$ which light up to indicate that the comparison between the standard signal A and the vocal signal $a_1$, $a_2$ . . . or $a_n$ emitted, in the comparator in question, has given a satisfactory result. In other words, each of the lamps $13_1$ . . . $13_i$ gives a visual indication of the result of the comparison made by the various comparators $9_1$ . . . $9_i$. Furthermore, the outputs of the various comparators $9_1$, $9_2$, . . . $9_i$ are connected to the output stage 8 to control the emission of the signals x and y as described above.

Each of the comparators may also be rendered active individually, thanks to the provision of push-button switches $14_1$, $14_2$, . . . $14_i$ which are connected to supply inputs of the respective comparators $9_1$, $9_2$ . . . $9_i$ and which are connected in common to a second pole of the switch 11. In other words, when this switch 11 is in its second position, all the push button switches $14_1$ . . . $14_i$ are connected to the source of voltage of appropriate polarity, and consequently it is possible to render active one or more of the comparators, as desired, by closing each corresponding switch from the assembly of push button switches $14_1$ . . . $14_i$.

The operation of the aparatus which has just been described will now be explained in detail, by considering the case in which this apparatus functions with automatic passage from one comparison stage to the following stage.

At the beginning, only the first comparator $9_1$ is active. Consequently, the first comparator $9_1$ compares the first standard signal A with the vocal signals $a_1, a_2 \ldots a_n$ emitted successively by the subject 2 into the microphone 7. The first comparator $9_1$ may make, for example, a comparison of the levels of intensity of the signals and when the threshold fixed for the comparison is reached, emits as its output a signal which provokes, on the one hand, illumination of the first pilot lamp $13_1$ and, on the other hand, unblocking of the first AND gate $12_1$. Illumination of the lamp $13_1$ then indicates that the assimilation of the language has been correctly effected as far as the intensity of the signals is concerned and that the subject may then pass to the comparison of a second parameter. As has been seen hereinbefore, the threshold of comparison may be regulated as desired; in other words, the first comparator $9_1$ may be adapted to emit a signal at its output when the level of intensity of the vocal signal $a_n$ emitted, for example, has attained 90 or 95% of the level of the standard signal A.

Once the comparator $9_1$ has tripped into a state indicating that the vocal signal emitted fulfills the condition posed, with respect to the standard signal A, as far as the first parameter fixed by the first comparator $9_1$ is concerned, the first gate $12_1$ is unblocked and it is then the second comparator $9_2$ which intervenes in the course of the language acquisition process. In other words, the second comparator $9_2$ compares the standard signal A with each of the vocal signals emitted successively and it makes, for example, a comparison of their rhythms. When the rhythm of the vocal signal emitted is judged to correspond, within the predetermined limits, to the standard signal A, the second comparator $9_2$ emits at its output a signal indicating that the threshold fixed for the comparison of the second parameter has been attained. As before, this signal provokes illumination of the lamp $13_2$ indicating that the ryhthm of the vocal signal emitted is correct and also unblocking the second gate $12_2$.

From the foregoing, it is therefore seen that the various parameters are considered successively for the comparison of the standard signal A and the vocal signal $a_1, a_2 \ldots a_n$ emitted, until the last comparator $9_i$ intervenes. When the latter emits at its output a signal indicating that the threshold fixed for the comparison of the last parameter in question is reached, at that moment the output stage 8 emits the signal y provoking replacement of the first standard signal A by the second standard signal B and the process continues in the same manner.

On the other hand, in manual mode, the switch 11 is placed in its second position and one or more of the comparators $9_1 \ldots 9_i$ which cite to make the comparison of the standard signal A and the vocal signals $a_1 \ldots a_n$ emitted, solely regarding one or more determined parameters, are selected by one or more of the push button switches $14_1 \ldots 14_i$.

When the apparatus according to the invention operates automatically with all the comparators connected in cascade, the successive elementary comparisons may be made in any order. In other words, in the first comparator $9_1$, an elementary comparison relative to any one of the parameters retained for analysis may first be made, followed, in the second comparator $9_2$, by a comparison relative to any other parameter.

A memory may, of course, also be provided in the analysis and comparison circuit 6, for permanently storing each of the standard signals A,B . . . for the whole period of time during which the various elementary comparisons are being made by the comparators $9_1, 9_2 \ldots 9_i$.

The apparatus according to the invention may also comprise a visual display device (screen) enabling the development of the language acquisition to be followed.

An audition conditioning apparatus incorporating filters, whose transmission characteristics are adapted to the treatment to which the subject is subjected, may of course possibly be connected between the standard signal generator 1 and the ear-phones 5.

What I claim is:

1. An apparatus for assisting a user in the practice of a language comprising:
   (a) a standard signal generator comprising means for storing a plurality of information blocks, said information blocks comprising at least one word in said language;
   (b) output means responsive to an applied repeat signal for outputting an audible standard signal which corresponds to one of said plurality of information blocks;
   (c) a microphone for inputting a word pronounced by the user and generating a corresponding vocal signal; and
   (d) an analysis and comparison circuit for comparing said standard signal and said vocal signal based on at least one parameter and generating a repeat signal only when said vocal signal does not match said standard signal within a predetermined, variable tolerance with respect to said at least one parameter, wherein said apparatus includes means for increasing or decreasing said tolerance as said output means is consecutively actuated.

2. The apparatus according to claim 1 wherein said analysis and comparison circuit generates an index signal for indicating a successful pronounciation only when said vocal signal does match said standard signal within said predetermined, variable tolerance and said output means outputs an audible standard signal corresponding to said one of said plurality of information blocks when said repeat signal has been generated and outputs an audible standard signal corresponding to another of said plurality of information blocks when said index signal has been generated.

3. The apparatus according to claim 2 wherein the apparatus further comprises means for temporarily storing one of said plurality of information blocks and said another of said plurality of information blocks responsive to said repeat signal, wherein when said repeat signal is generated, said means for temporarily storing stores said one of said plurality of information blocks and when said index signal is generated, said means for temporarily storing stores said another of said plurality of information blocks, and wherein said output means outputs an audible standard signal corresponding to the information block stored on said means for temporarily storing.

4. The apparatus according to claim 2 wherein said at least one parameter is selected from the group of: intensity, rhythm, slope and extent of pass band, latency time, precession time, attack of the vocal signal, and relaxing of the vocal signal.

5. The apparatus according to claim 2 wherein said analysis and comparison circuit comprises a plurality of two-input comparators, each having a first input connected to an output of said standard signal generator, a second input connected to said microphone, and an output, wherein each comparator is adapted to compare said standard signal and said vocal signal and yield an output value at said output with respect to each of said at least one parameter and wherein each comparator corresponds to one of said at least one parameter, and said predetermined tolerance comprises a tolerance value corresponding to each of said at least one parameter.

6. The apparatus according to claim 5 wherein said plurality of comparators are connected to one another via AND gates in cascade and an end comparator of the cascade is connected to said output means such that said repeat signal is applied to said output means when said output value is greater than the corresponding tolerance value with respect to any one of said at least one parameter, and said index signal is applied to said output means when said output value is less than the corresponding tolerance value with respect to each of said at least one parameter.

7. The apparatus according to claim 6 further comprising at least one pilot lamp connected to said output of each of said plurality of comparators for indicating when said output value of the comparator is less than said corresponding tolerance value with respect to said at least one parameter.

8. The apparatus according to claim 6 further comprising a switch which is adapted to be connected to a source of voltage, wherein said switch has a pole which is connected by supply inputs and a common conductor to all of said plurality of comparators for individually controlling each of said comparators.

9. The apparatus according to claim 8 wherein another pole of said switch is connected, via individual push-button switches, to supply inputs of each of said plurality of comparators to allow a user to individually selectively engage each comparator.

10. An apparatus for assisting a user in the practice of a language comprising:
  (a) a standard signal generator comprising first means for storing a plurality of information blocks comprising words and phrases in said language, second means for temporarily storing one of said plurality of information blocks, and an output for outputting one of a plurality of standard signals corresponding to said one of said plurality of information blocks;
  (b) an electric acoustic transducer connected to said output of said standard signal generator for audibly emitting said one of said plurality of standard signals;
  (c) a microphone for receiving a word pronounced by the user and generating a corresponding vocal signal; and
  (d) an analysis and comparison circuit for comparing said one of said plurality of standard signals and said vocal signal based on at least one parameter, said analysis and comparison circuit comprising at least one comparator, said at least one comparator having a first input connected to said output of said standard signal generator and a second input connected to said microphone, said analysis and comparison circuit having an output stage connected to said at least one comparator and to said standard signal generator for selectively generating a repeat signal and an index signal; and
  wherein said output stage generates said repeat signal only when said vocal signal does not match said at least one of said plurality of standard signals within a predetermined, variable tolerance with respect to said at least one parameter and wherein said electric acoustic transducer emits said one of said plurality of standard signals at said output of said standard signal generator in response to said repeat signal, wherein said apparatus includes means for increasing or decreasing said tolerance as said output stage is consecutively actuated, and said output stage generates said index signal only when said vocal signal does match said at least one of said plurality of standard signals within said predetermined, variable tolerance with respect to said at least one parameter and wherein said electric acoustic transducer outputs another of said plurality of standard signals at said output of said standard signal generator in response to said index signal.

11. The apparatus according to claim 10 wherein said at least one parameter is selected from the group of: intensity, rhythm, slope and extent of pass band, latency time, precession time, attack of the vocal signal, and relaxing of the vocal signal.

12. The apparatus according to claim 10 wherein said plurality of comparators are connected to one another in a cascading relationship via AND gates, and an end comparator of the cascade is connected to said output means such that said repeat signal is applied to said output means when said output value is greater than said predetermined, variable tolerance with respect to any one of said at least one parameter, and said index signal is applied to said output means when said output value is less than said predetermined, variable tolerance with respect to each of said at least one parameter.

13. The apparatus according to claim 10 further comprising:
  (a) at least one pilot lamp connected to an output of each of said plurality of comparators for indicating when said output value of the comparator is less than said predetermined variable tolerance with respect to said at least one parameter; and
  (b) a switch connected to a voltage source, said switch having a first and second pole, said first pole being connected by supply inputs and a common conductor to all of said plurality of comparators, and said second pole being connected, via individual push-button switches, to supply inputs of a corresponding comparator for allowing individual selection of each of the comparators.

14. An apparatus for assisting the practice of a lannguage comprising:
  (a) a standard signal generator for emitting standard signals comprising a mobile support of sound recordings for storing a previously recorded plurality of independent blocks of sound information, said plurality of independent blocks comprising words expressed in the language to be practiced, and means for reading said plurality of blocks;
  (b) an electric acoustic transducer connected to said standard signal generator for audibly emitting said plurality of blocks so that said plurality of blocks are heard by a user;
  (c) a microphone into which the user pronounces a sound message of at least one syllable;
  (d) an analysis and comparison circuit comprising a plurality of two-input comparators and an output stage; and
  wherein each of said plurality of comparators has a first input connected to an output of said standard signal generator and a second input connected to said microphone, said plurality of comparators being arranged to effect, with respect to at least one parameter, an elementary comparison between said standard signals emitted by said standard signal generator and a vocal signal corresponding to said sound message which is pronounced by the user when the user hears one of said plurality of independent blocks emitted by said electric acoustic transducer, said output stage being connected to said plurality of comparators and to said standard signal generator so as to cause the standard signal generator to emit a standard signal corresponding to said one of said plurality of independent blocks as long as said vocal signal corresponding to said sound message pronounced by the user when the user repeats the at least one of said plurality of blocks the user has just heard, does not concord, within an adjustable predetermined degree of approximation, with said standard signal corresponding to said one of said plurality of independent blocks with respect to the at least one parameter and said output stage causes the standard signal generator to emit a standard signal corresponding to another of said plurality of independent blocks with said vocal signal does concord, within said adjustable predetermined degree of approximation, with said standard signal corresponding to said one of said plurality of independent blocks with respect to the at least one parameter wherein said apparatus includes means for increasing or decreasing said tolerance as said standard signal is consecutively actuated.

15. An apparatus for assisting a user in the practice of a language comprising:
  (a) a standard signal generator comprising means for storing a plurality of information blocks corresponding to words and phrases in said language;
  (b) output means responsive to an applied repeat signal for outputting an audible standard signal corresponding to one of said plurality of information blocks;
  (c) a microphone for inputting a word pronounced by the user and generating a corresponding vocal signal; and
  (d) an analysis and comparison circuit for comparing said standard signal and said vocal signal based on at least one parameter and generating said repeat signal responsive to said comparison only when said vocal signal does not match said standard signal within a predetermined, variable tolerance with respect to said at least one parameter, and means for generating an index signal only when said vocal signal does match said standard signal within said predetermined, variable tolerance, wherein said apparatus includes means for increasing or decreasing said tolerances as said output means is consecutively actuated; and
  wherein said output means outputs an audible standard signal corresponding to said one of said plurality of information blocks when said repeat signal has been generated and ouputs an audible standard signal which corresponds to another of said plurality of information blocks when said index signal has been generated.

16. The apparatus according to claim 15 wherein the apparatus further comprises means for temporarily storing one of said plurality of information blocks and said another of said plurality of information blocks responsive to said repeat signal and said index signal, wherein when said repeat signal is generated, said means for temporarily storing stores said one of said plurality of information blocks and when said index signal is generated, said means for temporarily storing stores said another of said plurality of information blocks, and wherein said output means outputs an audible standard signal corresponding to the information block stored on said means for temporarily storing.

17. The apparatus according to claim 16 wherein said at least one parameter is selected from the group of: intensity, rhythm, slope and extent of pass band, latency time, precession time, attack of the vocal signal, and relaxing of the vocal signal.

18. The apparatus according to claim 15 wherein said analysis and comparison circuit comprises a plurality of two-input comparators, each having a first input connected to an output of said standard signal generator, a second input connected to said microphone, and an output, wherein each comparator is adapted to compare said standard signal and said vocal signal and yield an output value at said output with respect to each of said at least one parameter and wherein each comparator corresponds to one of said at least one parameter and said predetermined tolerance comprises a tolerance value corresponding to each of said at least one parameter.

19. The apparatus according to claim 18 wherein said plurality of comparators are connected to one another via AND gates in cascade and an end comparator of the cascade is connected to said output means such that said repeat signal is applied to said output means when said output value is greater than the corresponding tolerance value with respect to any one of said at least one parameter, and said index signal is applied to said output means when said output value is less than the corresponding tolerance value with respect to each of said at least one parameter.

20. The apparatus according to claim 18 further comprising at least one pilot lamp connected to said output of each of said plurality of comparators for indicating when said output value of the comparator is less than said corresponding tolerance value with respect to said at least one parameter.

21. The apparatus according to claim 18 further comprising a switch which is adapted to be connected to a source of voltage, wherein said switch has a pole which is connected by supply inputs and a common conductor to all of said plurality of comparators for individually controlling each of said comparators.

22. The apparatus according to claim 21 wherein another pole of said switch is connected, via individual push-button switches, to supply inputs of each of said plurality of comparators to allow a user to individually selectively engage each comparator.

23. A method of assisting a user in the practice of a language comprising:
  (a) storing a plurality of information blocks corresponding to words and phrases in said language;
  (b) outputting an audible standard signal which corresponds to one of said plurality of information blocks in response to an applied repeat signal and outputting an audible standard signal which corresponds to another of said plurality of information blocks in response to an applied index signal;
  (c) inputting a word pronounced by a user and generating a corresponding vocal signal;

(d) comparing the standard signal which was output and said vocal signal based on at least one parameter;

(e) generating said repeat signal responsive to said comparison only when said vocal signal does not match the standard signal which was output within a predetermined, variable tolerance with respect to said at least one parameter, and (f) decreasing or increasing said variable tolerance as said audible standard signal is output.

24. The method according to claim 23 further comprising the steps of:

(a) generating an index signal only when said vocal signal does match the standard signal which was output within said predetermined, variable tolerance; and (b) outputting an audible standard signal which corresponds to said one of said plurality of information blocks when said repeat signal has been generated, and outputting an audible standard signal which corresponds to another of said plurality of information blocks when said index signal has been generated.

25. The method according to claim 24 further comprising the steps of:

(a) temporarily storing said one of said plurality of information blocks when said repeat signal is generated; and (b) temporarily storing another of said plurality of information blocks when said index signal has been generated.

26. The method according to claim 25 wherein the step of outputting an audible standard signal comprises the step of outputting an audible standard signal which corresponds to the information block which was temporarily stored.

* * * * *